US006543623B2

(12) United States Patent
Sebright et al.

(10) Patent No.: US 6,543,623 B2
(45) Date of Patent: Apr. 8, 2003

(54) BELT FILTER PRESS WITH WINGED PRIMARY ROLLER

(75) Inventors: Brent H. Sebright, Hopkins, MI (US); Stuart Sebright, Allegan, MI (US); Joseph W. Dendel, Allegan, MI (US); Benjamin W. Dietz, Allegan, MI (US)

(73) Assignee: Sebright Products, Inc., Hopkins, MI (US)

(*) Notice: Subject to any disclaimer, the term of this patent is extended or adjusted under 35 U.S.C. 154(b) by 0 days.

(21) Appl. No.: 09/683,757

(22) Filed: Feb. 11, 2002

(65) Prior Publication Data

US 2002/0162787 A1 Nov. 7, 2002

Related U.S. Application Data

(60) Provisional application No. 60/287,895, filed on May 1, 2001.

(51) Int. Cl.[7] .................. B01D 33/04; B01D 33/056; B30B 9/24
(52) U.S. Cl. .................. 210/400; 210/401; 100/118
(58) Field of Search .................. 210/783, 400, 210/401; 100/118

(56) References Cited

U.S. PATENT DOCUMENTS

| 3,017,997 | A |   | 1/1962  | Hawkes et al.    |
|-----------|---|---|---------|------------------|
| 3,419,150 | A |   | 12/1968 | Davis            |
| 4,071,925 | A |   | 2/1978  | Folk             |
| 4,303,523 | A | * | 12/1981 | Ruppnig          |
| 4,475,453 | A |   | 10/1984 | Davis            |
| 4,563,278 | A | * | 1/1986  | Mutzenberg et al.|
| 4,889,628 | A |   | 12/1989 | Niemzig          |
| 4,917,009 | A |   | 4/1990  | Edo              |
| 6,024,228 | A |   | 2/2000  | Williams         |
| 6,036,029 | A |   | 3/2000  | Gommel et al.    |

* cited by examiner

Primary Examiner—Thomas M. Lithgow
(74) Attorney, Agent, or Firm—McGarry Bair PC

(57) ABSTRACT

A belt filter press for deliquifying a material comprises two endless filter belts disposed adjacent each other so that a portion of the belts travel together and converge towards one another and between which a material is progressively compressed, and a substantially cylindrically-shaped primary roller around which the belts are compressed having a longitudinal axis and ends, wherein the primary roller is provided with a plurality of radially extending fins, each of which has a wing at the free end thereof.

14 Claims, 3 Drawing Sheets

US 6,543,623 B2

BELT FILTER PRESS WITH WINGED PRIMARY ROLLER

CROSS REFERENCE TO RELATED APPLICATIONS

This application claims the benefit of U.S. Provisional Application No. 60/287,895, filed May 1, 2001.

BACKGROUND OF INVENTION

1. Field of the Invention

This invention relates to belt filter presses for removing liquid from a mixture of liquid and solid material. In one aspect, the invention relates to a primary roller with radially-extending wings for a belt filter press.

2. Description of the Related Art

Belt filter presses are utilized to remove liquid from a mixture of liquid and solid material, leaving a relatively dry, solid "cake" for disposal or further processing. The belt filter press comprises a frame and an assembly of rollers that support and drive an upper continuous belt and a lower continuous belt that are in operable communication with each other. The belts are permeable to allow the extrusion of the liquid therethrough. The mixture is first placed on the lower belt, then "sandwiched" between the upper and lower belts. The belts and the retained mixture then pass through a wedge section where the mixture is evenly distributed between the belts, and an initial volume of liquid is removed. The belts then pass through a series of progressively smaller diameter rollers where the retained mixture is compressed for further liquid removal. The belts are then separated and the dry "cake" is removed from the belts, generally by a scraping apparatus. The belts then pass through one or more belt washers, after which the process is repeated. The liquid from the extrusion and belt washing processes are collected for disposal.

The first roller that the belts contact after exiting the wedge section is typically the largest roller and extrudes the largest volume of liquid. These rollers may be either solid, or provided with channels to aid in the removal of the extruded liquid. With a solid roller, liquid that is extruded from the mixture must flow to the edges of the belts in order to be removed. With a channeled roller, the roller surface comprises discrete belt contact surfaces alternating with the channels. Pressure on the belts and retained mixture, and thus extrusion of liquid from the mixture, occurs only at the discrete belt contact surfaces. The fewer the contact surfaces, the less liquid will be extruded and the greater will be the wear on the belts. Typically, the belts pass beneath the first roller and, thus, extruded liquid falls by gravity away from the roller to be collected in an underlying container. With a channeled roller, some liquid moves toward the center of the roller as the belt travels around the roller. This liquid then must flow longitudinally to the roller ends to be removed. Some of this liquid can be retained in the interior of the roller and can be reintroduced into the belts and mixture. As well, liquid that has gradually built up in the interior of the roller can suddenly flush to the roller ends, missing the underlying container.

SUMMARY OF INVENTION

The invention comprises a winged primary roller for a belt filter press for removing liquid from a mixture of liquid and solid material. The belt filter press comprises two endless filter belts disposed adjacent each other so that a portion of the belts travel together and converge towards one another and between which a material is progressively compressed, and a substantially cylindrically-shaped primary roller around which the belts are compressed having a longitudinal axis and ends. The primary roller is provided with a plurality of radially extending fins, each of which has a wing at the free end thereof. The wings are arcuate and defined by a radius of curvature that is coaxial with the longitudinal axis of the roller. At least one taper piece is provided between the fins to direct fluid toward the ends of the roller. In one embodiment, the at least one taper piece between the fins has a first portion between the roller ends closer to the circumference of the roller and a second portion between the roller ends closer to the longitudinal axis of the roller. In another embodiment, the at least one taper piece between the fins has a first portion near the midpoint between the roller ends closer to the circumference of the roller and a second portion near the roller ends closer to the longitudinal axis of the roller. The at least one taper piece is triangular. At least one plate is provided adjacent to at least one end of the roller to direct liquid exiting the roller. The at least one plate is orthogonal to the longitudinal axis of the roller.

DETAILED DESCRIPTION

Figure 1:
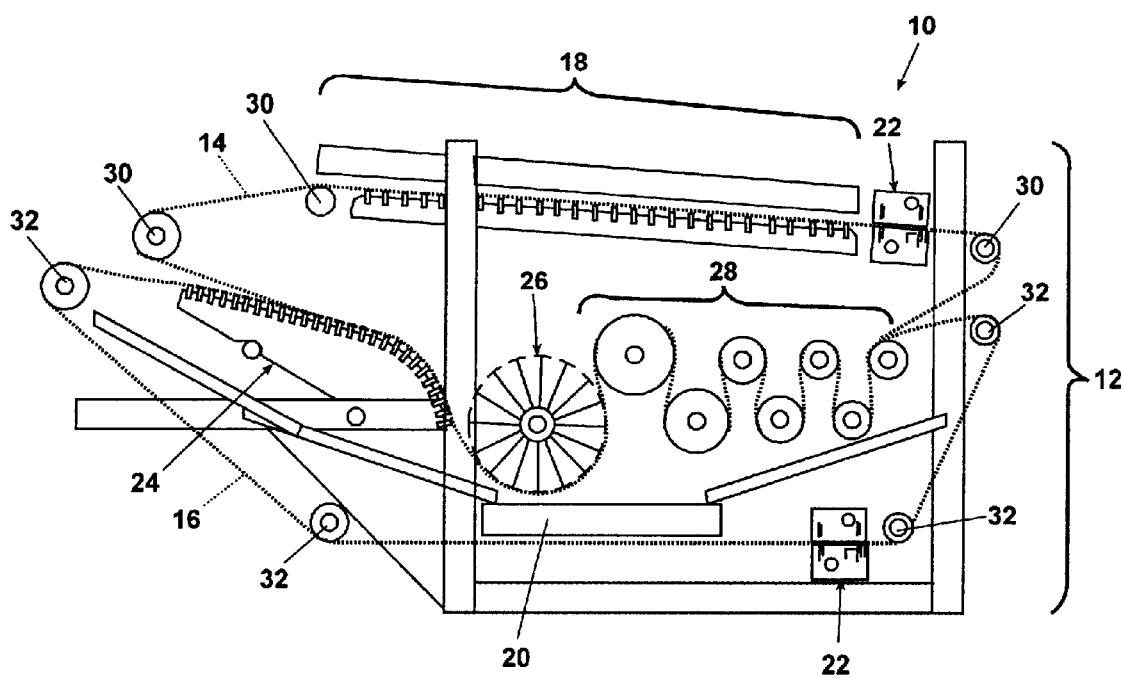
FIG. 1 is a side elevation view of a schematic of a belt filter press illustrating a curved wedge section, a wing roller, and belt washer assemblies according to the invention.

Referring now to FIG. 1, a belt filter press 10 according to the invention comprises a frame 12, an upper belt 14, a lower belt 16, a waste placement apparatus 18, liquid catch pans 20, belt washers 22, a wedge section 24, a winged primary roller 26, secondary rollers 28, upper belt guide rollers 38, and lower belt guide rollers 32. It will be readily understood by one skilled in the art that the belt filter press of FIG. 1 will also comprise suitable belt tensioning devices, belt drives, and controls, which for purposes of this disclosure will not be described herein. As with a conventional belt filter press, the belt filter press 10 of FIG. 1 extrudes liquid from a mixture of solid and liquid material by "sandwiching" the mixture between the two belts 14, 16, passing the belts over the wedge section 24 and around the wing roller 26 and secondary rollers 28, and discharging the dewatered solids upon separation of the belts 14, 16.

Figure 2:
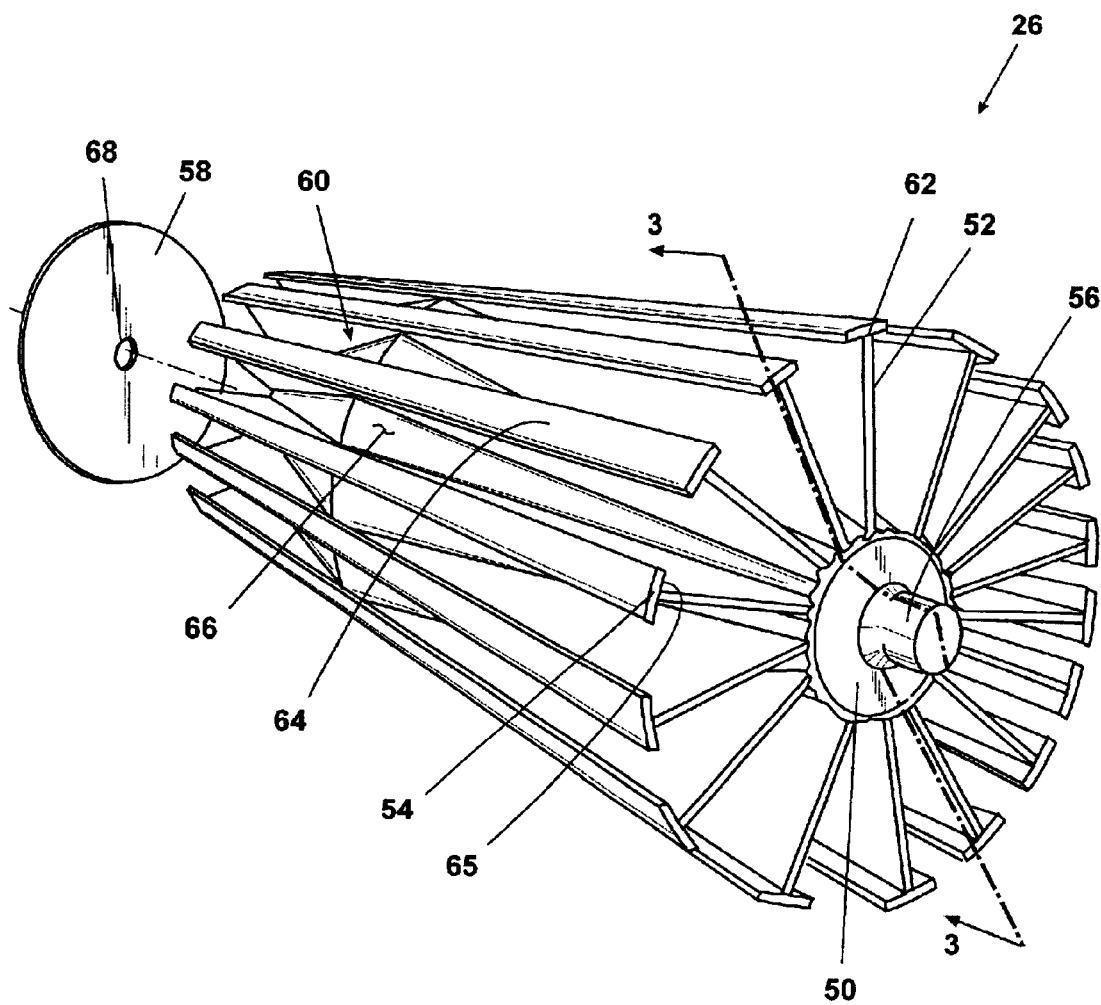
FIG. 2 is a perspective view of the wing roller of the belt filter press of FIG. 1.
Figure 3:
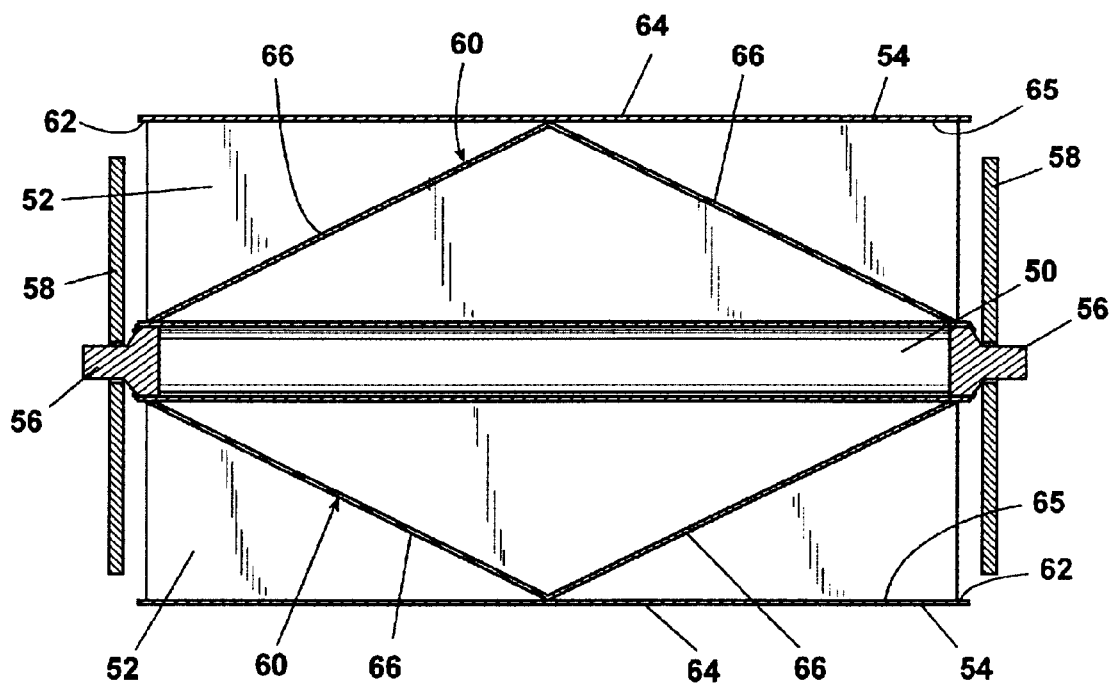
FIG. 3 is a sectional view of the wing roller of FIG. 2 taken along line 3—3.

The first roller around which the belts pass after leaving the wedge section in a conventional belt filter press is typically referred to as the "primary" roller. At this point in the dewatering process, the mixture typically has a relatively high liquids content. Thus, the volume of liquid removed due to the action of the "primary" roller is typically large. Referring now to FIGS. 2 and 3, a wing roller 26 according to the invention comprises generally an axle 50, a plurality of fins 52, a guard plate 58, and a plurality of taper pieces 60. The axle 50 comprises an elongated, cylindrical member which terminates at each end in a stud 56 that is journaled into a bearing (not shown) mounted to the frame 12 for rotation of the axle 50 about its longitudinal axis. The fins 52 comprise elongated, plate-like members extending radially from the axle 50 along the entire length of the axle 50. The fins 52 are rigidly attached to the axle 50 along one longitudinal edge, such as by welding, leaving a free edge 62 distal of the axle 50. A wing 54 comprises an elongated member with a slight curvature about its longitudinal axis defining a convex surface 64 and a concave surface 65. The wing 54 is rigidly attached at its concave surface 65 to the free edge 62 of the fin 52 along the entire length of the fin 52, such as by welding. Between each pair of adjacent fins 52 is a taper piece 60. Each taper piece 60 comprises two identical triangle pieces 66. The triangle pieces 66 are in the form of an isosceles triangle and are rigidly joined at the base to form the taper piece 60. In profile, the taper piece 60 is in the form of a shallow V. The taper piece 60 is rigidly attached to adjacent fins 52, such as by welding, with the vertex extending outwardly of the axle 50, and the apex of each triangle piece 66 attached to an end of the axle 50. The guard plate 58 comprises a circular plate with a guard plate aperture 68 extending through the center thereof, and adapted to accommodate the stud 56. The stud 56 is inserted through the aperture 68, and the guard plate 58 is rigidly connected to the axle 50, preferably by welding, somewhat apart from the fins 52.

In use, the belts 14, 16 with enveloped mixture pass from the wedge section 24 around the lower portion of the wing roller 26 along its circumference. The belts 14, 16 travel around the wing roller 26 to a vertical orientation prior to leaving the wing roller 26 to engage the secondary rollers 28. The wings 54 impart a pressure to the belts 14, 16 and the enveloped mixture, extruding liquid therefrom, which flows downwardly away from the wing roller 26 to liquid catch pans 20 to be collected. Where the belts 14, 16 are traveling in a vertical direction just prior to leaving the wing roller 26, liquid may flow toward the interior of the wing roller 26. Such liquid will be directed to the ends of the wing roller 26 by the taper pieces 60. The guard plate 58 will direct the liquid flowing off the taper pieces 60 in a downward direction to the liquid catch pans 20.

While the invention has been specifically described in connection with certain specific embodiments thereof, it is to be understood that this is by way of illustration and not of limitation. Reasonable variation and modification are possible within the scope of the forgoing description and drawings without departing from the spirit of the invention.

What is claimed is:

1. In a belt filter press for deliquifying a material, comprsing two endless filter belts disposed adjacent each other so that a portion of the belts travel together and converge towards one another and between which a material is progressively compressed, and a substantially cylindrically-shaped primary roller around which the belts are compressed having a longitudinal axis and ends, the improvement wherein:

the primary roller is provided with a plurality of radially extending fins, each of which has an arcuate wing defined by a radius of curvature at the free end thereof.

2. The belt filter press of claim 1, wherein the radius of curvature of the wings is coaxial with the longitudinal axis of the roller.

3. The belt filter press of claim 1, wherein at least one taper piece is provided between the fins to direct fluid toward the ends of the roller.

4. The belt filter press of claim 3, wherein the at least one taper piece between the fins has a first portion between the roller ends closer to the circumference of the roller and a second portion between the first portion and the roller ends closer to the longitudinal axis of the roller.

5. The belt filter press of claim 3, wherein the at least one taper piece between the fins has a first portion near the midpoint between the roller ends closer to the circumference of the roller and a second portion near the roller ends closer to the longitudinal axis of the roller.

6. The belt filter press of claim 3, wherein the at least one taper piece is triangular.

7. The belt filter press of claim 3, wherein at least one plate is provided adjacent to at least one end of the roller to direct fluid exiting the roller.

8. The belt filter press of claim 7, wherein the at least one plate is orthogonal to the longitudinal axis of the roller.

9. In a belt filter press for deliquifying a material, comprising two endless filter belts disposed adjacent each other so that a portion of the belts travel together and converge towards one another and between which a material is progressively compressed, and a substantially cylindrically-shaped primary roller around which the belts are compressed having a longitudinal axis and ends, the improvement wherein:

the primary roller is provided with a plurality of radially extending fins, each of which has a wing at the free end thereof, and a taper piece is provided between adjacent fins to direct fluid toward the ends of the roller.

10. The belt filter press of claim 9, wherein the at least one taper piece between the fins has a first portion between the roller ends closer to the circumference of the roller and a second portion between the roller ends closer to the longitudinal axis of the roller.

11. The belt filter press of claim 9, wherein the at least one taper piece between the fins has a first portion near the midpoint between the roller ends closer to the circumference of the roller and a second portion near the roller ends closer to the longitudinal axis of the roller.

12. The belt filter press of claim 9, wherein the at least one taper piece is triangular.

13. The belt filter press of claim 9, wherein at least one plate is provided adjacent to at least one end of the roller to direct fluid exiting the roller.

14. The belt filter press of claim 13, wherein the at least one plate is orthogonal to the longitudinal axis of the roller.

* * * * *